(No Model.)
W. H. SARGENT.
SCALE.
No. 534,842.  Patented Feb. 26, 1895.
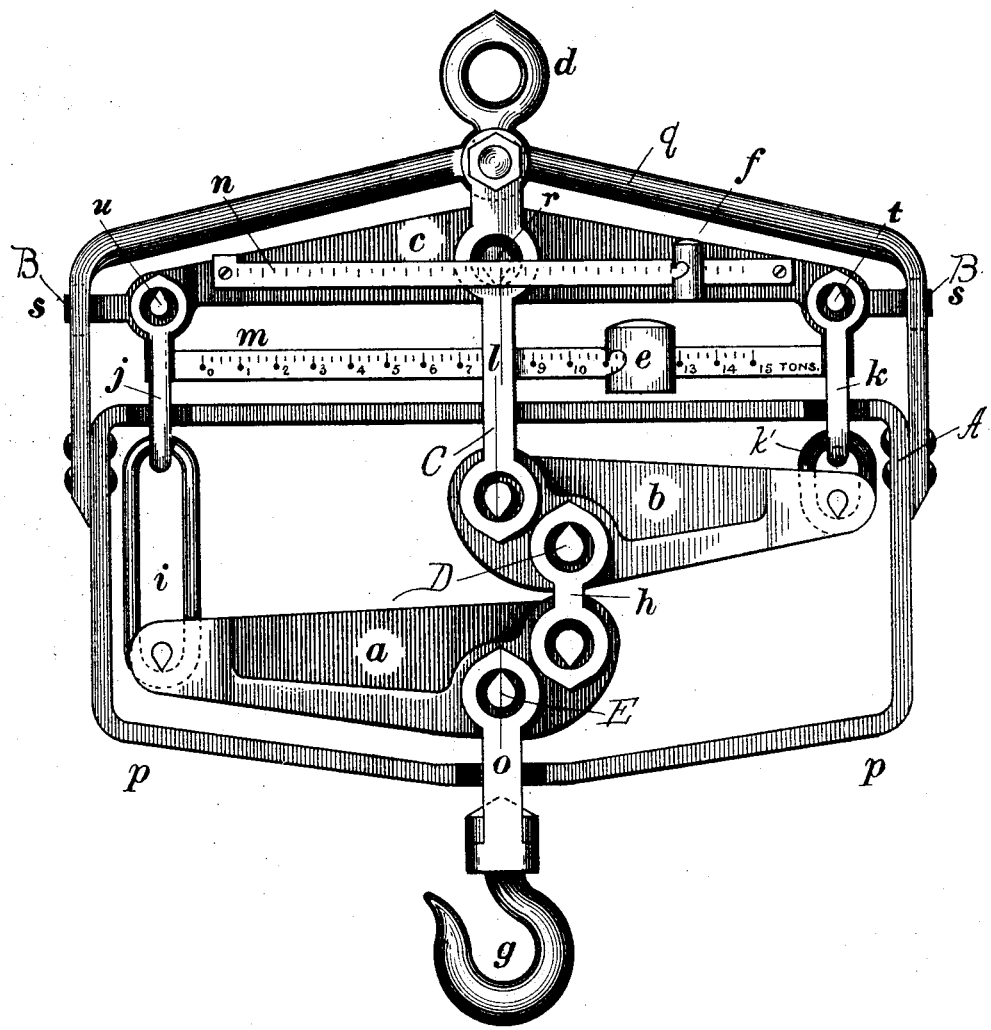
Witnesses,
K. Fairbanks
F. O. French.
Inventor,
Willis H. Sargent
By Attorney,
Chas. E. Sturtevant

UNITED STATES PATENT OFFICE.

WILLIS H. SARGENT, OF ST. JOHNSBURY, VERMONT, ASSIGNOR TO THE E. & T. FAIRBANKS & COMPANY, OF SAME PLACE.

SCALE.

SPECIFICATION forming part of Letters Patent No. 534,842, dated February 26, 1895.

Application filed November 27, 1894. Serial No. 530,095. (No model.)

*To all whom it may concern:*

Be it known that I, WILLIS H. SARGENT, a citizen of the United States, residing at St. Johnsbury, in the county of Caledonia, State of Vermont, have invented certain new and useful Improvements in Scales, of which the following is a description, reference being had to the accompanying drawing and to the letters of reference marked thereon.

My invention relates to an improvement in weighing scales and its object is to provide a weighing beam of large capacity, but of moderate length with poises of minimum size and which will balance itself without weights.

In the railroad scale as ordinarily constructed or, in fact, in any of the scales for weighing heavy bodies the entire beam is of great length, while only a small proportion is available for actual weighing purposes, and in addition thereto loose weights have to be provided to balance the free end of the beam before beginning to weigh. For example, in the ordinary railroad scale the beam is extended backward beyond the fulcrum pivot and upon its arm the balancing loose weights are placed and out of the entire length of the beam which is about five feet, only about twenty-seven inches are available for weighing, while the large poise weighs about twenty-seven pounds.

In another class of scales known as compound beams for cranes a short fulcrum is provided in the leverage of the beam, but the poises are used on the long arm of the beam outside of the fulcrum and, as above stated, loose weights must be provided to balance the free end of the beam before beginning to weigh. These compound beams vary in length from three and one-half feet to nearly nine feet, while with my invention a far greater degree of compactness may be secured.

My invention therefore consists in the matters hereinafter described and referred to in the appended claims.

I have herein shown this device as a weighing machine complete in itself inclosed in a suspended frame; but it will be understood that it may be substituted in place of the weighing beam on an ordinary scale by adapting levers and poises thereto, but these being obvious modifications I have not deemed it advisable to illustrate the same.

In the accompanying drawing the figure represents a side elevation of my improved weighing scale.

In the drawing A represents the frame-work composed of the two parts $p$, $q$ bolted or riveted together, the upper part having secured to it a ring $d$ by which the device may be suspended. The beam as a whole is marked $c$ and is fulcrumed at $r$, this pivot being off the center as per the center line shown at $l$.

$m$ represents one series of graduations on the beam as a whole, these graduations indicating, as shown, tons and fractions thereof, while the beam $n$ is more finely graduated and may indicate fifty pound spaces or less if desired. The poises $e, f$ slide respectively on these beams $m$, $n$. At either end of the beam are projections B working in slots $s$ in the upper part $q$ of the frame whereby the movement of the beam is limited. Outside of the graduations and upon what practically amounts to either end of the beam are knife edge pivots $t, u$ from which are hung loops $k$, $j$ from which, in turn, are hung links $k'$, $i$, the link $k'$ being much shorter than the link $i$.

Extending downward from the same standard upon which the knife edge pivot $r$ is supported is the part C having a hardened bearing in its lower end similar to the hardened bearing in which the pivot $r$ is supported. In this hardened bearing is placed the knife edge pivot of a lever $b$ which, at its opposite end, has a knife edge pivot supported by the link $k'$. This lever $b$ has a knife edge pivot D from which is hung a loop $h$ having, at its lower end, a bearing to receive a knife edge pivot on the lever $a$ which, at its opposite end, has a knife edge pivot resting in the link $i$. The load is supported in the device herein shown and described upon the hook $g$ secured to the loop $o$ having in its upper end a bearing hung upon the knife edge pivot E of the lever $a$. This pivot E is directly below the knife edge pivot on the inner end of the lever $b$, but is to one side of the fulcrum pivot of the weighing beam, thus throwing the long arm of the lever to the right and the short arm to the left.

This invention is, of course, based on the principle that the lever is balanced at a certain point which is marked at zero and at which the poise starts. Any movement, then, of the poise toward the outer end or long arm of the lever will only be off-set by applying a greater load to the short arm of the lever. For instance, in this case the load applied to the hook $g$ is transmitted to the lever $a$ and is there divided according to the multiplication of this lever, e. g. suppose the load, at $g$ to be fifteen tons and this lever $a$ multiplies five times. Then, one-fifth or three tons of the load is transmitted to the tip pivot of this lever and also to the pivot $u$ in the upper lever $c$ which corresponds to the weighing beam in other scales. The remaining four-fifths or twelve tons is applied to the second lever $b$ at $h$. This lever multiplies four times, so that one-fourth of twelve tons or, again, three tons are transmitted to the pivot $t$ at the other end of the lever $c$. Now, it will be readily seen that if the pivot $r$ is exactly midway between the pivots $u$ and $t$ there will be no action as the load on either end will balance that on the other. Now, let the pivot $r$ be moved ever so little out of the center as per center line, then a load on the long arm will over-balance the same load on the short arm in proportion to twice the distance of the pivot $r$ from the center, and, as this distance may be infinitely small, it follows that the poises $e$ and $b$ may be made very light and yet accurately weigh the load at $g$.

As above intimated, I do not desire to limit myself to the application of this invention to a weighing machine complete in itself; but it may be applied in place of the weighing beam on an ordinary scale or used in other connections.

Having thus described my invention, what I claim, and desire to secure by Letters Patent, is—

1. A weighing scale comprising a pivoted beam a poise sliding thereon, a support for the article to be weighed, and a series of multiplying levers between the support for the article to be weighed and the beam upon either side of the fulcrum pivot; substantially as described.

2. A weighing scale comprising a pivoted beam a poise sliding thereon, a support for the article to be weighed, and a series of multiplying levers connected to both ends of the beam, said beam being suitably graduated; substantially as described.

3. A weighing scale comprising the graduated weighing beam pivoted on suitable support a poise movable on said beam, the pivot points $t\ u$ upon either end of said beam, loops and links supported from said pivot points, and a series of multiplying levers intermediate the support for the article to be weighed and the pivots $t, u$; substantially as described.

4. In a scale, the weighing beam pivoted on a suitable standard, pivot points $t\ u$ upon opposite sides of the pivot point of said beam, loops and links supported from the pivot points $t, u$, a multiplying lever $b$ having a bearing at one end in the same standard upon which the beam is pivoted and supported at its other end by said loop and link connections with the pivot $t$, a second lever $a$ suspended at one end from the lever $b$ and at the other end from the loops and links supported by the pivot $u$, and a rod upon which the article to be weighed may be supported hung from a pivot on the lever $a$; substantially as described.

5. The herein described weighing scale comprising the frame-work adapted to be suspended, the two-part beam pivotally supported from said frame and having projections working in slots in said frame-work to limit its oscillation, poises sliding on each graduated part of the beam, a knife edge pivot on either side of the pivot point secured to the beam, a hook or other support for the article to be weighed, and a series of multiplying levers between said support and the knife edge pivots on either side the pivotal point of the beam; substantially as described.

6. In a weighing scale a pivoted beam a poise movable thereon, a series of multiplying levers connected to the beam upon either side of the pivot point, both series being connected to a single support for the article to be weighed; substantially as described.

7. In a weighing scale, a pivoted beam, a lever $b$, supported at one end from one end of the beam, a lever $a$ below said lever $b$ supported at one end from the opposite end of the beam and at its opposite end from the lever $b$, and means for suspending the article to be weighed from the lever $a$; substantially as described.

8. In a weighing scale, the pivoted beam, the lever $b$ supported at one end from one end of the beam and at the other end from the same standard to which the beam is pivoted, the lever $a$ supported at one end from the opposite end of the beam and at its other end from the lever $b$, with means for suspending the article to be weighed from the lever $a$; substantially as described.

9. In a weighing scale, the pivoted beam, having the knife edge pivots on either side the pivot point of said beam, the lever $b$ having pivots at either end, the intermediate pivot point D, the loop $h$ supported thereon, the lever $a$ having pivots at either end, one of which rests in the lower end of the loop, and the intermediate pivot E on the lever $a$ with means for suspending the article to be weighed from said pivot E; substantially as described.

10. A weighing scale comprising a pivoted beam, a support for the article to be weighed, a series of multiplying levers connected to and supported at one end from the beam upon either side of the pivot point, the opposite end of one of said series being supported from the other series; substantially as described.

In testimony whereof I affix my signature in presence of two witnesses.

WILLIS H. SARGENT.

Witnesses:
FRANK O. FRENCH,
K. FAIRBANKS.